United States Patent Office 3,303,171
Patented Feb. 7, 1967

3,303,171
CURE SYSTEM FOR ETHYLENE-VINYL CHLORIDE POLYMERS
Ann M. Schreiber, Parma Heights, Ohio, assignor to The B. F. Goodrich Company, New York, N.Y., a corporation of New York
No Drawing. Filed June 1, 1965, Ser. No. 460,547
4 Claims. (Cl. 260—79.5)

This invention relates to a process for the cure of rubbery ethylene-vinyl chloride copolymers.

Copolymers of ethylene and vinyl chloride are old in the art, being disclosed in United States Patent 2,200,429. Processes for preparation of ethylene-vinyl chloride polymers are disclosed in United States Patents 2,342,400, 2,388,178, 2,396,677, and 2,422,392.

Ethylene-vinyl chloride copolymers containing from 10% to 99% by weight ethylene are flexible plastic or rubbery elastomeric materials. These copolymers are prepared from inexpensive monomers, ethylene and vinyl chloride, and are of great interest to users of chlorinated elastomeric materials for the manufacture of hose and tubing, belts and film. Ethylene-vinyl chloride rubbers are saturated copolymers containing substantial amounts of chlorine. They are similar in structure to chlorinated polyethylene of similar chlorine content. Chlorobutyl rubber, and chlorosulfonated polyethylene are other saturated, specialty rubber systems presently known and used. As with chlorobutyl rubber, and chlorosulfonated polyethylene, the uses to which the materials can be put will be greatly increased if a means can be found to cure or crosslink the polymers to give them increased strength, improved wear properties, and resistance to aging and weathering.

Aldehyde-ammonia condensation products and heptaldehyde-aniline condensation products have been tried, both alone and in combination with sulfur, without success in attempts to cure rubbery ethylene-vinyl chloride copolymers.

When sulfur, the most widely known and used vulcanizing agent for rubbery materials, is used in curing recipes with rubbery, saturated ethylene-vinyl chloride copolymers the cure cannot be controlled and the stocks become degraded, blackened and brittle, with no favorable elastomeric properties.

It has now been found that when about 1 to 3 parts of sulfur are combined with about 4 to 8 parts of Trimene Base per 100 parts copolymer in the cure of these ethylene-vinyl chloride copolymers, rubbery, snappy materials useful for extrusion and molding are produced. Furthermore the ratio of Trimene Base to sulfur employed per 100 parts of copolymer has been found to be critical in producing cured copolymer of the best stress-strain properties. The preferred ratio of Trimene Base to sulfur is from 2:1 to 4:1. Trimene Base is a commercial product, believed to be a condensation product of ethylene chloride, formaldehyde and ammonia, and is further believed to have the configuration of 2,4,6-triethylhexahydro-S-triazine.

It is believed that alkyl substituted 2,4,6-hexahydro-S-triazines constitute the generic class of curing agents for combination with sulfur in this invention. These materials are represented by the formula

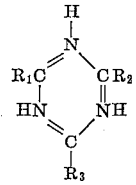

where $R_1$, $R_2$, and $R_3$ are alkyl groups containing from 1 to 4 carbon atoms and may all be the same, all be different, or be in any combination of $C_1$ to $C_4$ alkyl groups.

It is surprising that condensation products of this configuration serve very well in combination with sulfur as curing agents for rubbery ethylene-vinyl chloride copolymers when somewhat structurally similar condensation products of aldehydes and amines and aldehydes and aniline are of no value in this use.

Rubbery ethylene-vinyl chloride copolymers are readily prepared by known bulk and emulsion polymerization systems. Bulk polymerizations are performed in high pressure reactors at 1000 to 2000 atmospheres. Emulsion polymerizations are run at 100 to 300 atmospheres. Polymers are purified by dissolving in solvent, clarifying, and reprecipitating. Compounding and mixing of the polymers is performed on standard rubber mixing equipment, mills and the like.

Stocks are preferably press cured, but hot oven or autoclave curing is also feasible.

The following example is set forth as illustrative of this invention. Parts are in parts by weight.

*Example I*

The following recipe is charged to a high pressure polymerizer equipped for agitation and temperature control.

| Material: | Parts by weight |
|---|---|
| Vinyl chloride | 288 |
| Ethylene | 474 |
| Diisopropylperoxy-dicarbonate | 0.5 |

The polymerization is run for 66 minutes at 50° C. and 27,000 p.s.i. with a pressure drop of 6000 p.s.i. over the period. A white, elastomeric ethylene-vinyl chloride copolymer is purified by dissolving in chloroform and reprecipitating in methanol. The copolymer analyzes 31.3% vinyl chloride and 68.7% ethylene by weight. DSV in cyclohexanone at 25° C. (0.4 g./100 ml.) is 0.890.

The copolymer is compounded in the following recipes on a laboratory mill by milling the stocks for about 15 minutes. Data is set forth in Table 1.

These vulcanizates of recipe D develop no cracks in a chamber ozone test of 335 hours. Oil and solvent resistance are excellent. Brittleness temperature is below −74° C. Pico Abrasion Index is 276 and the vulcanizates are nonflammable in ASTM test D-635-56T.

TABLE 1

| Recipe | A | B | C | D | E | F |
|---|---|---|---|---|---|---|
| Copolymer | 100 | 100 | 100 | 100 | 100 | 100 |
| Carbon black | 40 | 40 | 40 | 40 | 40 | 40 |
| Stearic acid | 1 | 1 | 1 | 1 | 1 | 1 |
| Trimene Base | 3 | 1 | 3 | 5 | 3 | 5 |
| Sulfur | 0 | 2 | 2 | 2 | 0.5 | 0.5 |
| Trimene Base/Sulfur ratio | 3/0 | 0.5/1 | 1.5/1 | 2.5/1 | 6/1 | 10/1 |
| Min. cure at 310° F | 30 | 30 | 30 | 30 | 30 | 30 |
| Tensile (p.s.i.) | 1,270 | 1,100 | 2,140 | 3,760 | 2,450 | 1,780 |
| Elongation (percent) | 400 | 575 | 400 | 375 | 365 | 310 |
| 300% modulus | 1,100 | 490 | 1,860 | 3,140 | 1,820 | -------- |
| Remarks | (1) | (1) | (2) | (3) | (2) | (1) |

[1] Weak cure.  [2] Fair cure.  [3] Excellent cure.

I claim:
1. A vulcanizable ethylene-vinyl chloride copolymer composition comprising 100 parts of an unvulcanized ethylenevinyl chloride copolymer, about 1 to 3 parts of sulfur, and from about 4 to about 8 parts of an alkyl substituted 2,4,6-hexahydro-S-triazine of the formula

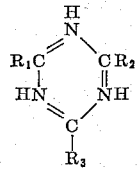

wherein $R_1$, $R_2$, and $R_3$ are alkyl groups containing from 1 to 4 carbon atoms, the ratio of said parts of triazine to said parts of sulfur being between 2:1 and 4:1.

2. The composition of claim 1 wherein the 2,4,6-hexahydro-S-triazine is 2,4,6-triethylhexahydro-S-triazine.

3. The process for curing ethylene-vinyl chloride copolymer compositions containing 10% to 99% ethylene by weight comprising adding to 100 parts of said copolymer from 1 to 3 parts of sulfur, and from about 4 to about 8 parts of an alkyl substituted 2,4,6-hexahydro-S-triazine of the formula wherein $R_1$, $R_2$, and $R_3$ are alkyl groups containing from 1 to 4 carbon atoms, the ratio of said parts of triazine to said parts of sulfur being between 2:1 and 4:1.

4. The process of claim 3 wherein the 2,4,6-hexahydro-S-triazine is 2,4,6-triethylhexahydro-S-triazine.

References Cited by the Examiner

UNITED STATES PATENTS

| | | | |
|---|---|---|---|
| 1,989,042 | 1/1935 | Kunz et al. | 260—791 |
| 2,405,008 | 7/1946 | Berry et al. | 260—79.5 |
| 2,416,878 | 3/1947 | Lindsey et al. | 260—79.5 |

JOSEPH L. SCHOFER, *Primary Examiner.*

D. K. DENENBERG, *Assistant Examiner.*